G. B. WILLIAMS.

Apparatus for Stirring and Cooling Lard.

No. 3,183. Reissued Nov. 10, 1868.

Witnesses:

J. W. B. Coungton

Wm Trewin.

Inventor:

Giles B. Williams

Per Munn & Co

Attys

N. PETERS, Photo-Lithographer, Washington, D. C.

United States Patent Office.

ELISHA M. ALLEN, OF NEW YORK, N. Y., ASSIGNEE OF GILES B. WILLIAMS.

*Letters Patent No.* 61,907, *dated February* 5, 1867; *reissue No.* 3,183, *dated November* 10, 1868.

IMPROVED APPARATUS FOR STIRRING, MIXING, HEATING, COOLING, AND EVAPORATING LARD AND OTHER SUBSTANCES.

The Schedule referred to in these Letters Patent and making part of the same.

*To all whom it may concern:*

Be it known that GILES B. WILLIAMS, of the city, county, and State of New York, did obtain Letters Patent, dated February 5, 1867, on a new and improved Device for Stirring, Heating, and Cooling Lard, which Letters Patent, by virtue of assignments duly recorded in Patent Office, were assigned, set over, and transferred to ELISHA M. ALLEN, of the city, county, and State of New York, which I now term a new and improved Apparatus for Stirring, Mixing, Heating, Cooling and Evaporating Liquids; and I do hereby declare that the following is a full, clear, and exact specification thereof, which will enable those skilled in the art to make and use the same, reference being had to the accompanying drawings, forming part of this specification, in which—

Figure 1:
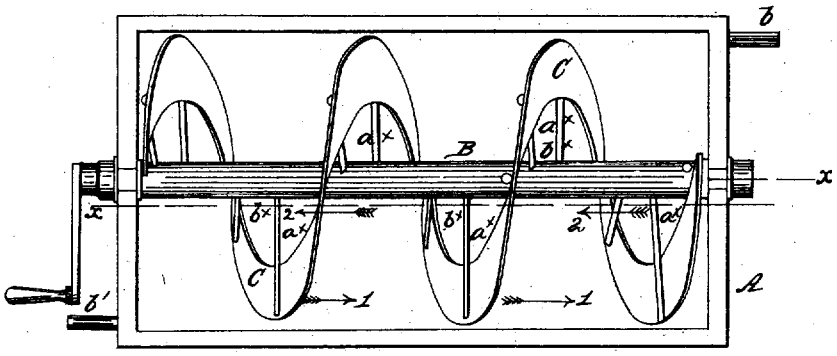

Figure 1 is a plan or top view of my invention.

Figure 2:
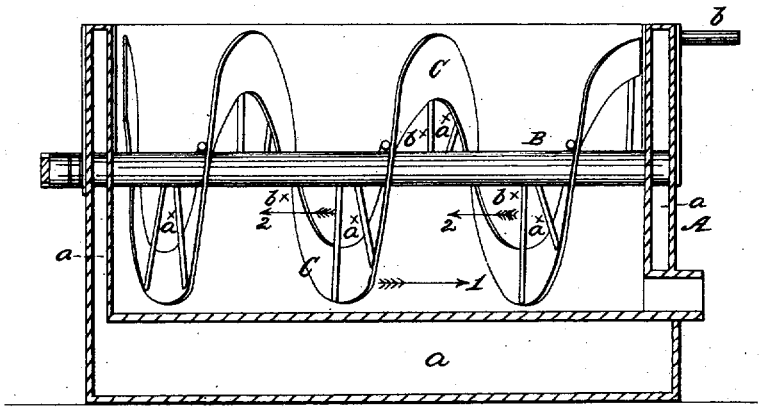

Figure 2, a longitudinal vertical section of the same, taken in the line *x x*, fig. 1.

Similar letters of reference indicate corresponding parts.

This invention relates to a new and improved device for stirring lard during the process of heating and cooling the same, and it consists in the employment or use of a horizontal screw, placed in the lard-receptacle, and arranged in such a manner as to keep the lard in constant motion. The invention also consists in using, in connection with the screw, a double-walled lard-receptacle, through which hot or cold water, or steam, may be passed, for the purpose of heating and cooling the lard.

A represents the lard-receptacle, which may be constructed of wood or metal, and of rectangular or other suitable form.

This receptacle is made with double walls, a space, *a*, being allowed between, with an induction-pipe, *b*, at the upper part of one end, and an eduction-pipe, *b'*, at the lower part of its opposite end, both of which are shown in fig. 1.

B is a shaft, placed horizontally in the receptacle A, one end passing entirely through one end of the receptacle, and having a crank or driving-pulley applied or attached to it.

The shaft B runs in stuffing-boxes in the ends of the receptacle A, and a screw-flange, C, is attached to the shaft, extending its whole length, and attached to arms $a^{\times}$, leaving an opening, $b^{\times}$, at its centre, around the shaft, as shown clearly in both figures.

The periphery of the screw-flange C just clears the bottom and sides of the receptacle A, and the interior of the receptacle, at its lower part, may be of semicircular form in its transverse section, corresponding, in dimensions, to the diameter of the screw-flange C.

On turning the screw-shaft B from left to right, the lard in the receptacle A will be forced in the direction indicated by arrow 1, and will return under said pressure, or force through the opening or space, $b^{\times}$, around the shaft B, in the direction indicated by arrow 2, and all the particles or molecules of the lard will be well stirred, the lard being moved in a constant unbroken stream forward and backward within the receptacle.

The bottom of the receptacle is curved concentrically with the shaft B.

The edge of the flange C sweeps the sides and bottom of the receptacle.

The liquid is raised and forced toward one end of the receptacle, along its sides, by rotating the screw, and unites at that end, and returns in a continuous stream, through the opening between the shaft and flange, whereby a new surface of the liquid is continually presented to the atmosphere, facilitating its cooling, and quickly reducing it to the temperature of the atmosphere.

In discharging the liquid, it is forced with equal pressure through the discharge-spout, regardless of quantity in the receptacle, admitting of regularity in filling cans, pots, or other vessels.

The shaft may be made hollow, so that steam or heat may be passed through it, which will assist in preventing the thickening of the liquid before it is forced out of the receptacle, and likewise prevent its lodgment on the shaft.

In heating or rendering lard, a flow of warm water or steam is allowed to pass through the space between the double walls of the receptacle, and, in cooling the lard, a stream of cold water is allowed to pass through.

The stirring of the lard causes the heat or cold to be rapidly transmitted, from molecule to molecule, throughout the entire mass, and the work may be performed with a very moderate expenditure of power.

I would remark that the blades and arms may, if desired, be made hollow, as well as the shaft.

I would further remark that, in the operation of the machine, the screw-flanges raise, as they rotate, the contents of the receptacle the height of the flanges, and force them in the direction of arrow 1, meeting a counter-current passing in an opposite direction, (see arrow 2,) thereby causing a thorough mixing of liquids, when two or more kinds are to be incorporated together.

Having thus described my invention,

I claim as new, and desire to secure by Letters Patent—

The continuous flange C, secured to the shaft B by arms $a^{\times}$, leaving an opening, $b^{\times}$, between the flange and shaft, in combination with a receptacle, A, whose bottom is curved concentrically with said shaft, substantially as described, for the purpose specified.

ELISHA M. ALLEN.

Witnesses:

H. L. WATTENBERG.

A. R. HAIGHT.